(12) United States Patent
Nakao et al.

(10) Patent No.: US 9,315,629 B2
(45) Date of Patent: Apr. 19, 2016

(54) BENZOXAZINE-SYSTEM COMPOSITION, AND THERMOSETTING MATERIAL AND VARNISH THEREOF

(75) Inventors: Hiroaki Nakao, Tokyo (JP); Kazuya Takemura, Tokyo (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 445 days.

(21) Appl. No.: 13/879,499

(22) PCT Filed: Oct. 21, 2011

(86) PCT No.: PCT/JP2011/074886
§ 371 (c)(1),
(2), (4) Date: Apr. 15, 2013

(87) PCT Pub. No.: WO2012/057298
PCT Pub. Date: May 3, 2012

(65) Prior Publication Data
US 2013/0217820 A1 Aug. 22, 2013

(30) Foreign Application Priority Data

Oct. 26, 2010 (JP) .................................. 2010-239904
Aug. 3, 2011 (JP) .................................. 2011-170088

(51) Int. Cl.
*C09D 179/04* (2006.01)
*C08G 73/02* (2006.01)
*C09D 179/02* (2006.01)
*C08G 73/06* (2006.01)

(52) U.S. Cl.
CPC ........ *C08G 73/0683* (2013.01); *C08G 73/0233* (2013.01); *C09D 179/02* (2013.01); *C09D 179/04* (2013.01)

(58) Field of Classification Search
CPC ............... C09D 179/04; C09D 179/02; C08G 73/0233; C08G 73/0683

USPC .......................................................... 524/95
See application file for complete search history.

(56) References Cited

U.S. PATENT DOCUMENTS 6,900,269 B2 * 5/2005 Hwang ................ C08G 59/304
525/109

FOREIGN PATENT DOCUMENTS

| JP | 49-47378 | 5/1974 |
|---|---|---|
| JP | 60-155234 | 8/1985 |
| JP | 60-177074 | 9/1985 |
| JP | H11-217416 | 8/1999 |
| JP | H11-228786 | 8/1999 |
| JP | 2003-064180 | 3/2003 |
| JP | 2004352670 A * | 12/2004 |
| JP | 2005272722 A * | 10/2005 |
| JP | 2008037957 A * | 2/2008 |
| JP | 2010-077380 | 4/2010 |

OTHER PUBLICATIONS

International Search Report, PCT/JP2011/074886, Jan. 31, 2012.

* cited by examiner

*Primary Examiner* — Angela C Scott
(74) *Attorney, Agent, or Firm* — Young & Thompson

(57) ABSTRACT

A heat-curable composition comprises 30-70 mass % of a compound represented by formula (1) and 70-30 mass % of a compound represented by formula (2). In formulae (1) and (2), $R^1$, $R^2$, $R^3$ and $R^4$ are the same as or different from one another, and are independently selected from the group consisting of —H, —$CH_3$, —$C(CH_3)_3$ and a group represented by formula (i) for each of compound molecules. In formula (i), Y is selected from the group consisting of —O—, —$CH_2$— and —$C(CH_3)_2$—. The heat-curable composition containing the benzoxazine compound has excellent solubility in solvents, heat resistance and flame retardancy, and therefore can be used for providing a cured product of the composition or a varnish.

16 Claims, 1 Drawing Sheet

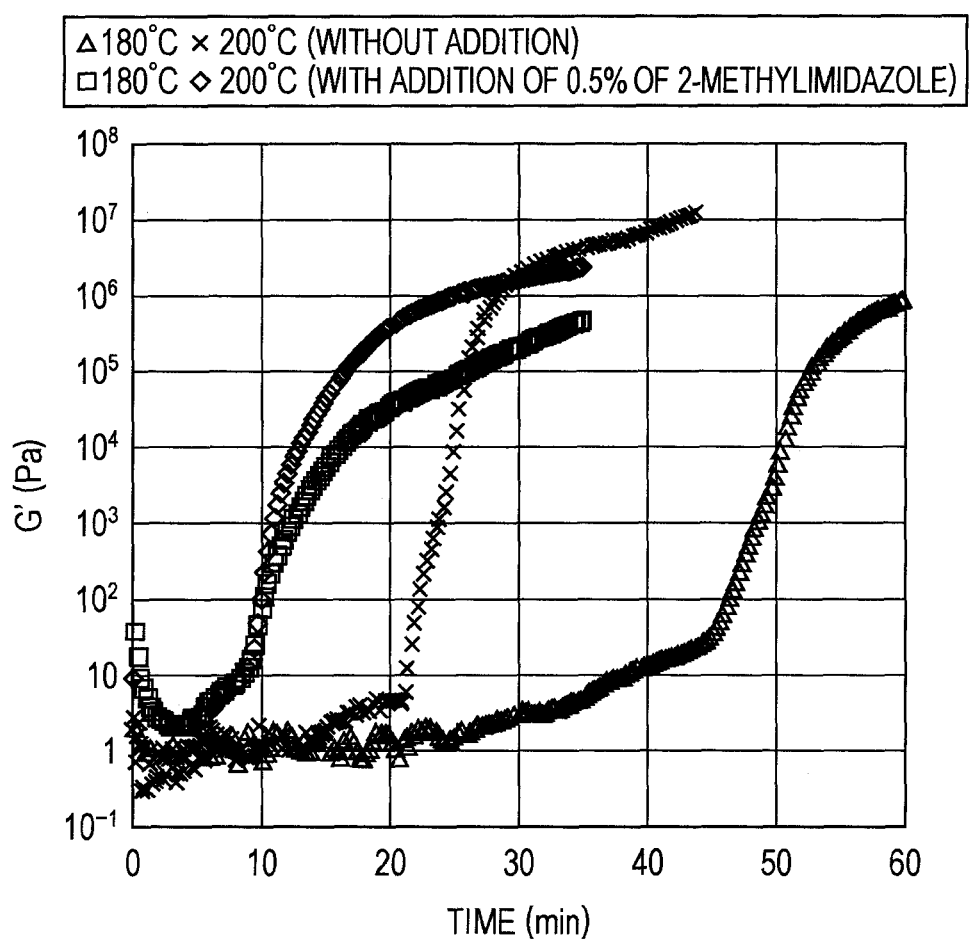

BENZOXAZINE-SYSTEM COMPOSITION, AND THERMOSETTING MATERIAL AND VARNISH THEREOF

TECHNICAL FIELD

The present invention relates to a thermosetting composition including benzoxazine compounds, and to a thermosetting material and a varnish thereof.

BACKGROUND ART

Benzoxazine compounds are cured when heated without generating volatile by-products. Further, they exhibit excellent properties such as heat resistance, flame retardance and electrical characteristics. Thus, the compounds are used in a wide variety of applications including laminated sheets, adhesives, electronic materials such as sealants, and complexes with carbon fibers, namely, prepregs. Further, benzoxazine compounds attract attention as alternative shaping materials to replace phenolic resins and epoxy resins.

The benzoxazine compounds may be easily synthesized from a phenol, an amine and an aqueous paraformaldehyde or formaldehyde solution as materials. A number of syntheses have been reported (for example, Patent Literatures 1 to 3).

However, the benzoxazine compounds with excellent heat resistance have problems in that because of their high crystallinity, the compounds are poor in solubility with respect to low-boiling solvents and are precipitated during a long storage at a low temperature. Further, because many of the benzoxazine compounds are prepared from aniline as the main material, insufficient heat resistance arises from the removal of aniline during curing.

CITATION LIST

Patent Literature

[PTL 1] Japanese Unexamined Patent Application Publication No. 60-155234
[PTL 2] Japanese Unexamined Patent Application Publication No. 60-177074
[PTL 3] Japanese Unexamined Patent Application Publication No. 49-47378

SUMMARY OF INVENTION

Technical Problem

Thus, there has been a need for a thermosetting composition including benzoxazine compounds which exhibits excellent properties such as solvent solubility, heat resistance and flame retardance, as well as for a thermosetting material and a varnish thereof.

It is therefore an object of the present invention to provide a thermosetting composition including benzoxazine compounds which exhibits excellent solvent solubility, heat resistance and flame retardance, as well as a thermosetting material and a varnish thereof.

Solution to Problem

The present inventors carried out studies in order to achieve the above object. As a result, the present inventors have found that a thermosetting composition containing a benzoxazine structure exhibits excellent solvent solubility, heat resistance and flame retardance by including compounds represented by Formulae (1) and (2) below at specific proportions. According to the finding, a thermosetting material and a varnish of the composition are also provided.

That is, the present invention provides the following [1] to [8].

[1] A thermosetting composition including 30 to 70% by mass of a compound represented by Formula (1) below and 70 to 30% by mass of a compound represented by Formula (2) below:

[Chem. 1]

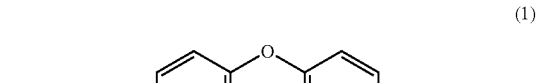

(1)

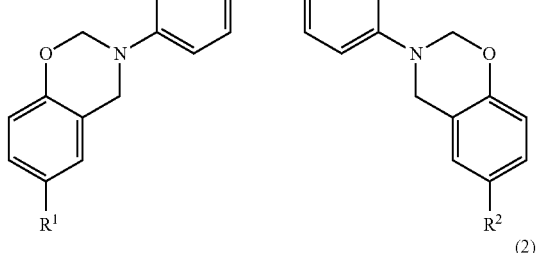

(2)

In Formulae (1) and (2), $R^1$, $R^2$, $R^3$ and $R^4$ may be the same or different from one another and are each selected independently with respect to each molecule of the compounds from the group consisting of —H, —CH$_3$, —C(CH$_3$)$_3$ and a group represented by Formula (i) below:

[Chem. 2]

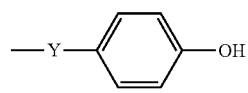

(i)

In Formula (i), Y is selected from the group consisting of —O—, —CH$_2$— and —C(CH$_2$)$_2$—.

[2] The thermosetting composition described in [1], wherein in the thermosetting composition, the total number of moles of the group represented by Formula (i) in the compound of Formula (1) and the group represented by Formula (i) in the compound of Formula (2) represents 1 to 50 mol % relative to the total number of moles of $R^1$ and $R^2$ in the compound represented by Formula (1) and $R^3$ and $R^4$ in the compound represented by Formula (2).

[3] The thermosetting composition described in [1] or [2], further including a compound represented by Formula (3) below in an amount of 0.1 to 30 parts by mass with respect to 100 parts by mass of the total of the compound represented by Formula (1) and the compound represented by Formula (2):

[Chem. 3]

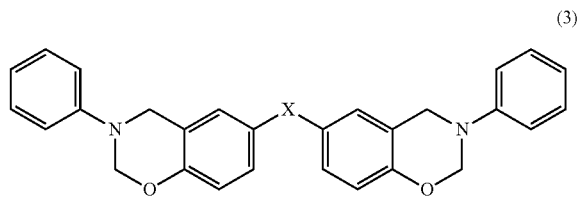

(3)

In Formula (3), X is selected from the group consisting of —O—, —CH$_2$— and —C(CH$_2$)$_2$—.

[4] A varnish including the compound of Formula (1) and the compound of Formula (2) described in [1] or [2], and an organic solvent in which the compound of Formula (1) and the compound of Formula (2) are dissolved.

[5] A varnish including the compound of Formula (1), the compound of Formula (2) and the compound of Formula (3) described in [3], and an organic solvent in which the compound of Formula (1), the compound of Formula (2) and the compound of Formula (3) are dissolved.

[6] A thermosetting material obtained by thermally curing the thermosetting composition described in any of [1] to [3].

[7] The thermosetting composition described in any of [1] to [3], which exhibits a solubility of not less than 60% with respect to acetone or methyl ethyl ketone and, after being dissolved, does not form a precipitate even when being stored at 5° C. or below for 2 or more weeks.

[8] The thermosetting material described in [6], which has a glass transition temperature (Tg) of not less than 175° C. and less than 250° C., a 5% weight loss temperature (Td5%) of not less than 350° C. and not more than 450° C., a water absorption of not more than 1.0% and a flame retardance of UL 94 V-0 to V-1.

Advantageous Effects of Invention

According to the present invention, it is possible to provide benzoxazine-system compositions with excellent solvent solubility, heat resistance and flame retardance, as well as varnishes and thermosetting materials thereof. The inventive benzoxazine-system compositions, varnishes thereof or thermosetting materials thereof may be used in laminated sheets, adhesives, and electronic materials such as sealants.

BRIEF DESCRIPTION OF DRAWING

FIG. 1 is a graph showing relationships between the dynamic viscoelasticity (G') and the heating time measured in EXAMPLE 10.

DESCRIPTION OF EMBODIMENTS

Hereinbelow, embodiments for carrying out the present invention will be described in detail.

[Thermosetting Compositions]

The present invention is directed to a thermosetting composition which includes 30 to 70% by mass of a compound represented by Formula (1) below and 70 to 30% by mass of a compound represented by Formula (2) below:

[Chem. 4]

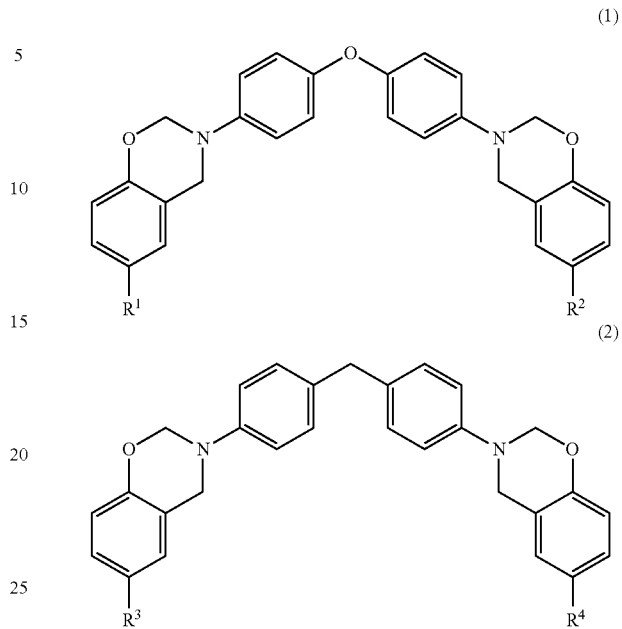

(1)

(2)

In Formulae (1) and (2), R$^1$, R$^2$, R$^3$ and R$^4$ are each selected independently with respect to each molecule of the compounds from the group consisting of —H, —CH$_2$, —C(CH$_3$)$_3$ and a group represented by Formula (i) below:

[Chem. 5]

(i)

In Formula (i), Y is selected from the group consisting of —O—, —CH$_2$— and —C(CH$_2$)$_2$—. The invention is also directed to a varnish and a thermosetting material of the composition.

The compounds represented by Formula (1) will be described.

The term "benzoxazine compound" in the invention refers to a compound having a benzoxazine ring.

The compound represented by Formula (1) is a benzoxazine compound. The compound may be synthesized by a reaction in which materials including 4,4'-diaminodiphenyl ether as a diamine, and phenol, p-cresol, t-butylphenol, Bisphenol A, Bisphenol F, Bisphenol S and/or 4,4'-dihydroxydiphenyl ether as a phenol(s) are mixed together with a paraformaldehyde or formaldehyde solution in a non-polar solvent such as toluene and reacted (for example, under reflux of toluene) with a diamine:phenol:paraformaldehyde or formaldehyde molar ratio of 1:2:4.1 to 4.5.

The phenol is preferably one, or two or more selected from the group consisting of phenol, Bisphenol A, Bisphenol F, Bisphenol S, 4,4'-dihydroxydiphenyl ether and 4,4'-biphenol, more preferably one or two selected from the group consisting of phenol, Bisphenol A and Bisphenol F, and still more preferably phenol.

In the case where the phenol used in the synthesis is a mixture of two or more kinds of phenols, the compound represented by Formula (1) is synthesized as a mixture (a composition).

$R^1$ and $R^2$ in such compounds represented by Formula (1) depend on the types of the phenols used in the synthesis, and the molar ratio of the synthesized compounds depends on the molar ratio of the phenols.

For example, a synthesis involving phenol (p mol) and Bisphenol F as the phenols with a molar ratio of p:(1−p) (wherein 0<p<1) will be discussed. Under ideal reaction conditions, this synthesis can give a compound (in which $R^1=R^2=H$), a compound (in which $R^1=H$ and $R^2=$4-hydroxybenzyl group or in which $R^1=$4-hydroxybenzyl group and $R^2=H$) and a compound (in which $R^1=R^2=$4-hydroxybenzyl group) with a molar ratio of $p^2$:2p(1−p):(1−p)$^2$, respectively.

The compound represented by Formula (2) also is a benzoxazine compound. The compound may be synthesized by a reaction in which materials including 4,4'-diaminodiphenylmethane as a diamine, and phenol, p-cresol, t-butylphenol, Bisphenol A, Bisphenol F, Bisphenol S and/or 4,4'-dihydroxydiphenyl ether as a phenol(s) are mixed together with a paraformaldehyde or formaldehyde solution in a non-polar solvent such as toluene and reacted (for example, under reflux of toluene) with a diamine:phenol:paraformaldehyde or formaldehyde molar ratio of 1:2:4.1 to 4.5.

The phenol is preferably one, or two or more selected from the group consisting of phenol, Bisphenol A, Bisphenol F, Bisphenol S, 4,4'-dihydroxydiphenyl ether and 4,4'-biphenol, more preferably one or two selected from the group consisting of phenol, Bisphenol A and Bisphenol F, and still more preferably phenol.

In the case where the phenol used in the synthesis is a mixture of two or more kinds of phenols, the compound represented by Formula (2) is synthesized as a mixture (a composition).

$R^3$ and $R^4$ in such compounds represented by Formula (2) depend on the types of the phenols used in the synthesis, and the molar ratio of the synthesized compounds depends on the molar ratio of the phenols.

For example, a synthesis involving phenol (q mol) and Bisphenol F as the phenols with a molar ratio of q:1−q (wherein 0<q<1) will be discussed. Under ideal reaction conditions, this synthesis can give a compound (in which $R^3=R^4=H$), a compound (in which $R^3=H$ and $R^4=$4-hydroxybenzyl group or in which $R^3=$4-hydroxybenzyl group and $R^4=H$) and a compound (in which $R^3=R^4=$4-hydroxybenzyl group) with a molar ratio of $q^2$:2q(1−q):(1−q)$^2$, respectively.

$R^1$, $R^2$, $R^3$ and $R^4$ are independent from one another. This independency stands not only between the compound of Formula (1) and the compound of Formula (2), but also between molecules of the compound of Formula (1) and between molecules of the compound of Formula (2).

That is, $R^i$ (i=1, 2) in a molecule of the compound represented by Formula (1) is independent from $R^i$ of another molecule, and $R^j$ (j=3, 4) in a molecule of the compound represented by Formula (2) is independent from $R^j$ of another molecule.

Thus, the compound of Formula (1) in the inventive thermosetting composition may be a single compound or a mixture of two or more kinds of compounds as long as the compound(s) can be represented by Formula (1). The same applies to the compound represented by Formula (2).

The thermosetting composition of the invention may be prepared so as to have a chemical composition which includes 30 to 70% by mass of the compound represented by Formula (1) and 70 to 30% by mass of the compound represented by Formula (2), by separately producing the compound of Formula (1) and the compound of Formula (2) and physically mixing the compounds together, and/or by chemically mixing the compounds at an initial stage, namely, by reacting the materials at the prescribed proportions. The above chemical composition ensures cold storage stability of a varnish as well as an increase in glass transition temperature of a thermosetting material.

As described above, the inventive thermosetting composition includes the compound represented by Formula (1) and the compound represented by Formula (2). In an embodiment, the thermosetting composition may contain the compound represented by Formula (1) and the compound represented by Formula (2). In another embodiment, it may be a thermosetting composition containing the compound represented by Formula (1), the compound represented by Formula (2) and a compound represented by Formula (3) described later.

In the specification, the thermosetting composition including the benzoxazine compounds will be sometimes referred to as "benzoxazine-system composition".

In the synthesis of the compound represented by Formula (1) and/or the compound represented by Formula (2), the phenol may be a combination of one or more monofunctional phenols selected from the group consisting of phenol, p-cresol and t-butylphenol, and a difunctional phenol selected from the group consisting of Bisphenol A, Bisphenol F, Bisphenol S and 4,4'-dihydroxydiphenyl ether. In such a case, the difunctional phenol preferably represents 1 to 50 mol %, and more preferably 5 to 20 mol % of the total of the phenols.

That is, the total number of moles of the group represented by Formula (i) in the compound of Formula (1) and the group represented by Formula (i) in the compound of Formula (2) in the thermosetting composition preferably represents 1 to 50 mol %, and more preferably 5 to 20 mol % relative to the total number of moles of $R^1$ and $R^2$ in the compound represented by Formula (1) and $R^3$ and $R^4$ in the compound represented by Formula (2).

When the molar percentage is in the above range, the composition exhibits higher solvent solubility.

From the viewpoint of solubility in low-boiling solvents, it is desirable that the concentration of the main component in the above chemical composition be not less than 50%.

Preferably, the thermosetting composition of the present invention further includes a compound represented by Formula (3) below in an amount of 0.1 to 30 parts by mass with respect to 100 parts by mass of the total of the compound represented by Formula (1) and the compound represented by Formula (2).

[Chem. 6]

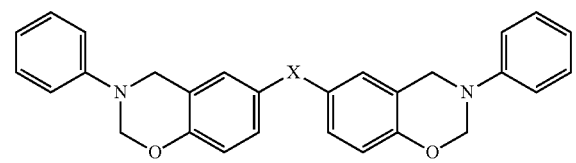

(3)

In Formula (3), X is selected from the group consisting of —O—, —CH$_2$— and —C(CH$_3$)$_2$—.

The compound represented by Formula (3) is a benzoxazine compound. The compound may be synthesized by a reaction in which materials including aniline as an amine, and Bisphenol A, Bisphenol F and/or 4,4'-dihydroxydiphenyl ether as a phenol(s) are mixed together with a paraformaldehyde or formaldehyde solution in a non-polar solvent such as toluene and reacted (for example, under reflux of toluene) with an amine:phenol:paraformaldehyde or formaldehyde molar ratio of 2:1:4.1 to 4.5.

The phenol is preferably one, or two or more selected from the group consisting of phenol, Bisphenol A, Bisphenol F, Bisphenol S, 4,4'-dihydroxydiphenyl ether and 4,4'-biphenol, more preferably one or two selected from the group consisting of phenol, Bisphenol A and Bisphenol F, and still more preferably phenol.

Preferably, the compound represented by Formula (3) is contained in an amount of 0.1 to 30 parts by mass, and more preferably 5 to 10 parts by mass with respect to 100 parts by mass of the total of the compound represented by Formula (1) and the compound represented by Formula (2). This content ensures that the solubility in solvents is further improved.

The thermosetting composition of the invention may further contain a curing accelerator.

The curing accelerators are not particularly limited. Specific examples include imidazoles such as 1-methylimidazole, 2-methylimidazole, 1,2-dimethylimidazole and 2-phenylimidazole.

The solvent solubility of the inventive thermosetting composition with respect to low-boiling solvents is preferably measured by a method described in the property measurement methods later. It is desirable that the solubility be not less than 60%, and more desirably not less than 65% with respect to acetone (boiling point: 56.5° C.) or methyl ethyl ketone (boiling point: 79.5° C.).

In the present invention, the term "low-boiling solvent" refers to an organic solvent having a boiling point of not more than 150° C. at normal pressure.

[Varnishes]

A varnish of the invention includes the compound of Formula (1) and the compound of Formula (2), and an organic solvent in which the compounds are dissolved; or includes the compound of Formula (1), the compound of Formula (2) and the compound of Formula (3), and an organic solvent in which the compounds are dissolved.

The organic solvents are not particularly limited as long as the solvent can dissolve the above compounds. Specific examples include non-polar solvents such as toluene and xylene, aprotic polar solvents such as N-methyl-2-pyrrolidone (NMP) and N,N-dimethylacetamide (DMAc), alcohols and alkyl acetates.

The varnish of the invention may further contain a curing accelerator.

The curing accelerators are not particularly limited. Specific examples include imidazoles such as 1-methylimidazole, 2-methylimidazole, 1,2-dimethylimidazole and 2-phenylimidazole.

The cold storage stability of the inventive varnish is preferably evaluated by a method described in the property measurement methods later. It is desirable that the varnish be free from visible precipitates (evaluation: Absent) after storage of 2 or more weeks at 5° C. or below.

When the inventive thermosetting composition contains the compound of Formula (1) and the compound of Formula (2), or is a compound containing the compound of Formula (1), the compound of Formula (2) and the compound of Formula (3), the varnish of the invention may be a varnish including such a thermosetting composition and an organic solvent in which the thermosetting composition is dissolved.

[Thermosetting Materials]

A thermosetting material of the invention is produced by thermally curing the inventive thermosetting composition described above.

Thermal curing conditions may be determined appropriately in accordance with the thermosetting composition, and may be, for example, 250° C.×3 hours or 220° C.×5 hours.

The glass transition temperature (Tg) of the inventive thermosetting material is preferably measured by a method described in the property measurement methods later. It is desirable that the glass transition temperature be not less than 175° C. and less than 250° C.

The water absorption of the inventive thermosetting material is preferably measured by a method described in the property measurement methods later. It is desirable that the water absorption be not more than 1.0%, and more desirably not more than 0.5%.

The flame retardance (UL 94) of the inventive thermosetting material is preferably measured by a method described in the property measurement methods later. It is desirable that the flame retardance according to UL 94 be V-0 or V-1, and more desirably V-0.

The 5% weight loss temperature (Td5%) of the inventive thermosetting material is preferably measured by a method described in the property measurement methods later. It is desirable that the 5% weight loss temperature be not less than 350° C. and not more than 450° C.

[Property Measurement Methods]

In the present invention, the following methods are preferably used in order to measure or evaluate the purity (the concentration of the main component) of the benzoxazine compounds or the benzoxazine-system compositions, the solvent solubility of the thermosetting compositions and the cold storage stability of the varnishes, as well as the glass transition temperature, the water absorption, the 5% weight loss temperature, the flame retardance and the curing rate of the thermosetting materials.

<<Purity (Concentration of Main Component)>>

The purity may be measured by gel permeation chromatography (GPC). The carrier is tetrahydrofuran (THF). The measurement temperature is 40° C. Columns Shodex 801, 802, 802.5 and 803 are connected in series. The combined total of the peaks assigned to a monomer is obtained as the purity (unit: % by mass).

<<Solvent Solubility>>

A thermosetting composition prepared by mixing benzoxazine compounds is gradually dissolved in acetone. The solubility is determined at the point where the dissolution ceases (unit: %). A solubility of not less than 60% is acceptable.

<<Cold Storage Stability>>

A thermosetting composition containing a benzoxazine ring is dissolved in acetone to give an acetone solution with a concentration of 60% by mass in terms of solid content. The solution is stored in a refrigerator at not more than 5° C. for about one month. The presence or absence of visible precipitates is evaluated (evaluation: Present/Absent). A solution in which such precipitates are "Absent" is acceptable.

<<Glass Transition Temperature (Tg)>>

A thermosetting composition is thermally cured by being heated at 250° C. for 3 hours to give a thermosetting material.

With use of a differential scanning calorimeter (DSC), this thermosetting material is heated in a nitrogen atmosphere at a temperature increase rate of 20° C./min. The glass transition temperature is determined based on the temperature at which the change of specific heat is observed (unit: ° C.). A glass transition temperature of not less than 175° C. is acceptable.

<<Water Absorption>>

A thermosetting material is soaked in water for 24 hours. The weight increase percentage between before and after the soaking is obtained as the water absorption (unit: %). A water absorption of not more than 0.6% is acceptable.

<<5% Weight Loss Temperature (Td5%)>>

With use of DTG-60 manufactured by Shimadzu Corporation, a thermosetting material is heated in an air atmosphere at a temperature increase rate of 10° C./min. When a 5% weight loss is reached, the temperature is obtained as the 5% weight loss temperature (unit: ° C.). This Td5% is an indicator of heat resistance. The higher this temperature, the higher the heat resistance. A temperature of not less than 375° C. is acceptable.

<<Flame Retardance (UL 94)>>

The flame retardance (UL 94) is evaluated in the following manner. A thermosetting material is shaped into a rectangular test piece and is held vertically. A burner flame is applied to the lower end for 10 seconds and is thereafter removed from the test piece. If the flame extinguishes, the burner flame is immediately applied to the test piece for another 10 seconds and is thereafter removed. The flame retardance is evaluated as follows based on the burning times after the first and second flame applications, the total of the burning time and the afterglow time after the second flame application, the total of the burning times of five test pieces, and the presence or absence of flaming drips.

V-0 means that the burning time is within 10 seconds, and V-1 and V-2 mean that the burning time is within 30 seconds after each of the first and second flame applications. Further, V-0 means that the total of the burning and afterglow times after the second flame application is within 30 seconds, and V-1 and V-2 mean that the total of these times is within 60 seconds. Furthermore, V-0 means that the total of the burning times of five test pieces is within 50 seconds, and V-1 and V-2 mean that the total of these times is within 250 seconds. The presence of flaming drips is allowed only for V-2. It should be noted that any test pieces should not burn out.

<<Curing Rate>>

A thermosetting material was analyzed with viscoelastometer PHYSICA MCR300 manufactured by DKSH Japan K.K. at measurement temperatures of 180° C. and 200° C., a frequency of 1 Hz and a strain of 1% to determine the dynamic viscoelasticity (G').

EXAMPLES

The present invention will be described in greater detail by presenting EXAMPLES. However, the scope of the invention is not limited to such EXAMPLES.

Synthetic Examples

<Synthetic Example A> Synthesis of O-P Type Benzoxazine Compound 4,4'-Diaminodiphenyl ether (hereinafter, referred to as "4,4'-ODA"), phenol and 92% paraformaldehyde were reacted together in toluene with a molar ratio of 1:2:4.1, respectively. Toluene was distilled away, and a compound A (hereinafter, referred to as "O-P type") was obtained. The purity was measured to be 65% by GPC.

[Chem. 7]

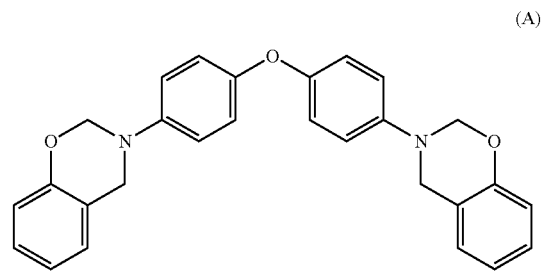

(A)

<Synthetic Example B> Synthesis of D-P Type Benzoxazine Compound 4,4'-Diaminodiphenylmethane (hereinafter, referred to as "4,4'-MDA"), phenol and 92% paraformaldehyde were reacted together in toluene with a molar ratio of 1:2:4.1, respectively. Toluene was distilled away, and a compound B (hereinafter, referred to as "D-P type") was obtained. The purity was measured to be 60% by GPC.

[Chem. 8]

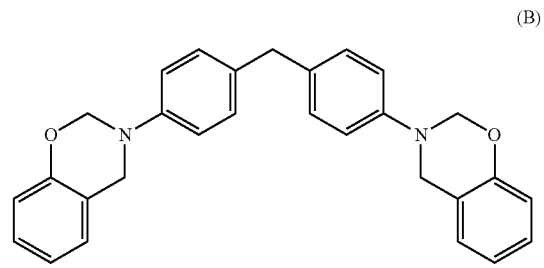

(B)

<Synthetic Example C1> Synthesis of Bisphenol A-Modified Benzoxazine-System Composition 4,4'-ODA, phenol, Bisphenol A (hereinafter, referred to as "BisA") and 92% paraformaldehyde were reacted together in toluene with a molar ratio of 1:1.8:0.1:4.1, respectively. Toluene was distilled away, and a composition C1 (hereinafter, referred to as "O-PB type") was obtained. The purity was measured to be 60% by GPC.

[Chem. 9]

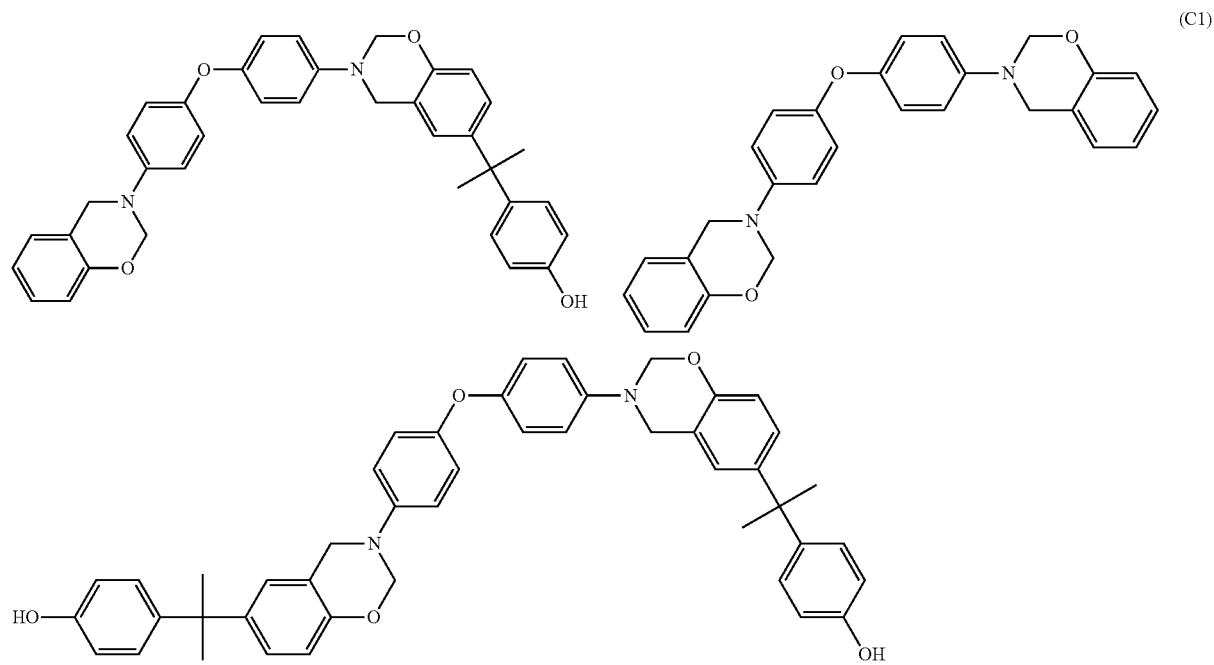

(C1)

<Synthetic Example C2>

The reaction was carried out in the same manner as in SYNTHETIC EXAMPLE C1 except that 4,4'-ODA was replaced by 4,4'-MDA, thereby preparing a composition C2 (hereinafter, referred to as "D-PB type"). The purity was measured to be 50% by GPC.

<Synthetic Example D> Synthesis of B-A Type Benzoxazine Compound

Aniline, BisA and 92% paraformaldehyde were reacted together in toluene with a molar ratio of 1:2:4.1, respectively. Toluene was distilled away, and a compound D (hereinafter,

[Chem. 10]

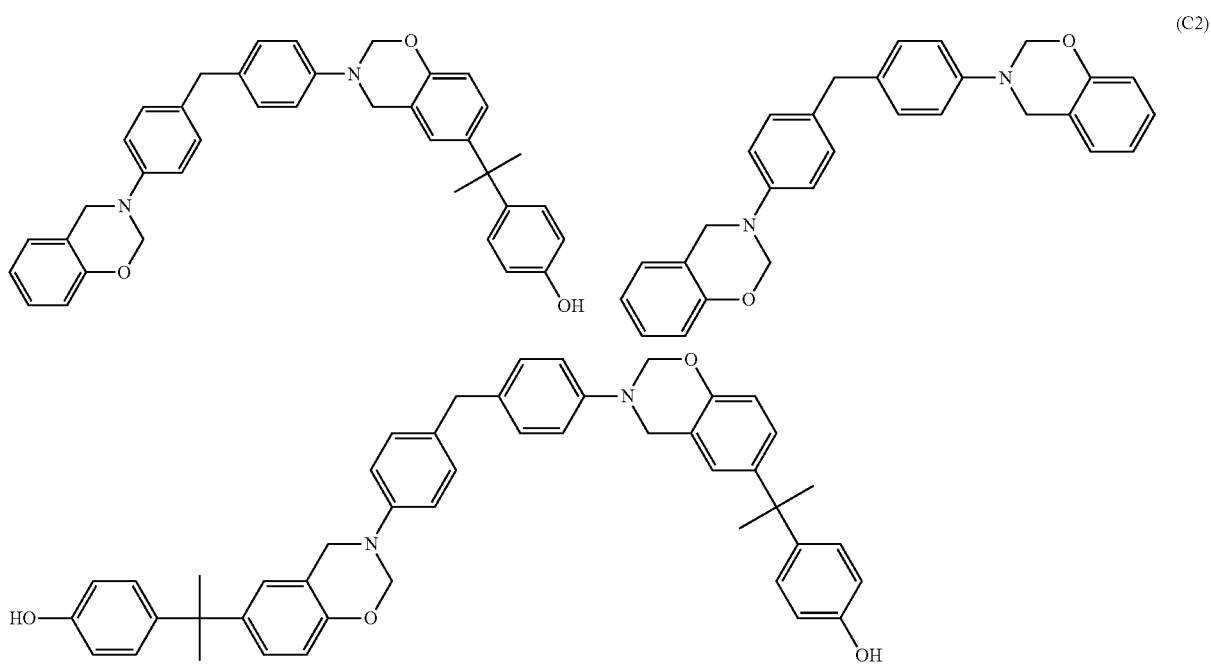

(C2)

referred to as "B-A type") was obtained. The purity was measured to be 85% by GPC.

[Chem. 11]

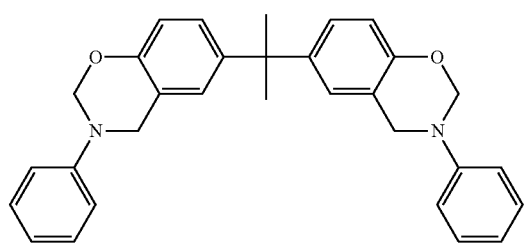

(D)

<Synthetic Example E> Synthesis of Mixed Type Benzoxazine-System Composition

Equimolar amounts of 4,4'-ODA and 4,4'-MDA were mixed with each other to give a diamine mixture. This diamine mixture, phenol and paraformaldehyde were reacted together in toluene with a molar ratio of 1:2:4.1, respectively. Toluene was distilled away, and a composition E was obtained. The purity was measured to be 55% by GPC.

[Chem. 12]

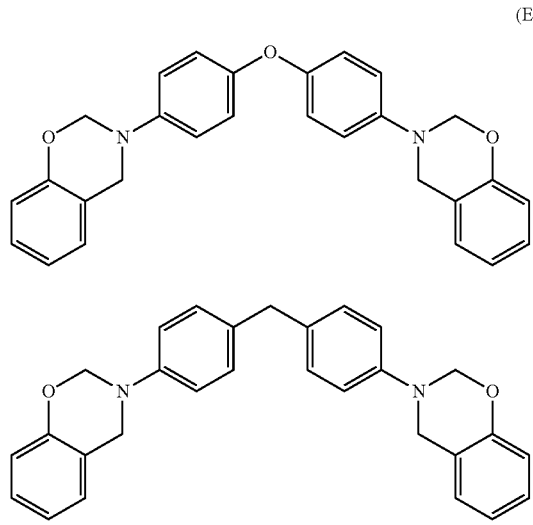

(E)

<Synthetic Example F> Synthesis of O-C Type Benzoxazine Compound Using Modified Phenol 4,4'-ODA, p-cresol and 92% paraformaldehyde were reacted together in toluene with a molar ratio of 1:2:4.1, respectively. Toluene was distilled away, and a compound F (hereinafter, referred to as "O-C type") was obtained. The purity was measured to be 75% by GPC.

[Chem. 13]

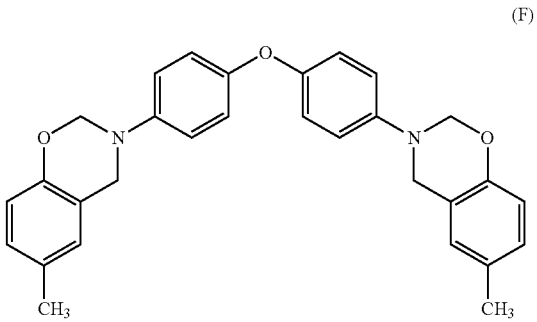

(F)

<Synthetic Example G> Synthesis of O-TB Type Benzoxazine Compound

The reaction was carried out in the same manner as in SYNTHETIC EXAMPLE F except that p-cresol was replaced by t-butylphenol, thereby preparing a compound G (hereinafter, referred to as "O-TB type"). The purity was measured to be 45% by GPC.

[Chem. 14]

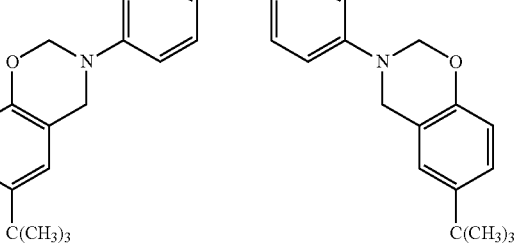

(G)

<Synthetic Example C3> Synthesis of Bisphenol A-Modified Benzoxazine-System Composition 4,4'-ODA, phenol, BisA and 92% paraformaldehyde were reacted together in toluene with a molar ratio of 1:1.0:0.5:4.1, respectively. Toluene was distilled away, and a composition C3 (hereinafter, referred to as "O-PBH type") was obtained. The purity was measured to be 30% by GPC.

[Chem. 15]

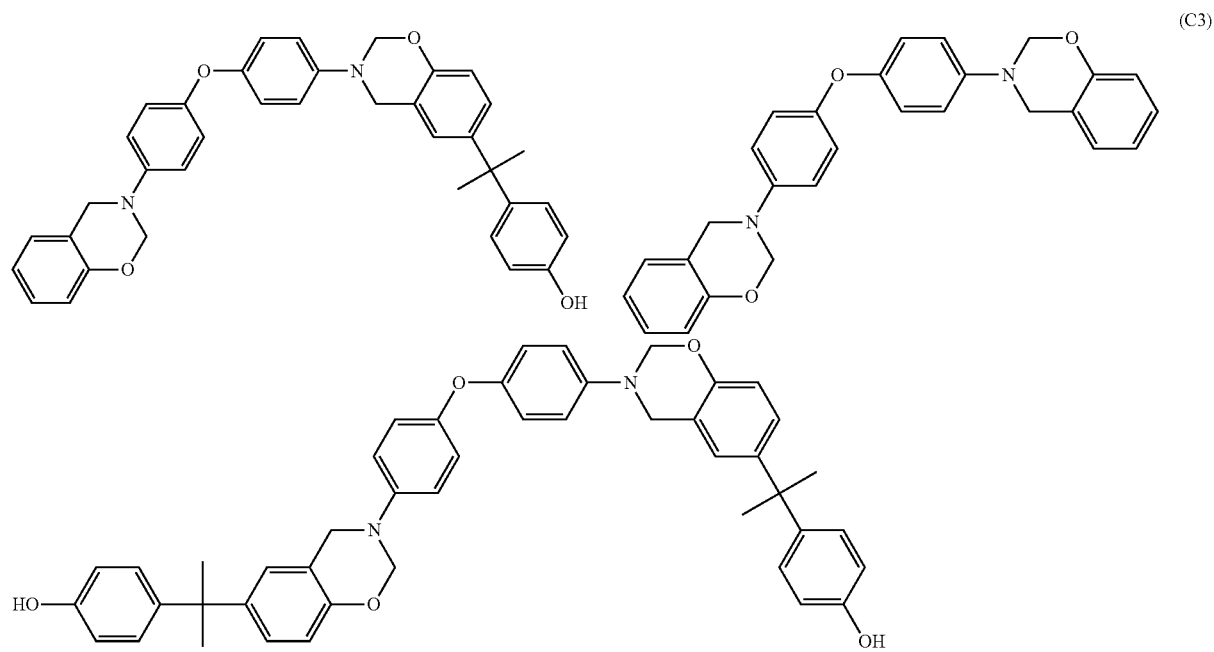

(C3)

<Synthetic Example H> Synthesis of Oxydiphenol-Modified Benzoxazine-System Composition 4,4'-ODA, phenol, 4,4'-oxydiphenol and 92% paraformaldehyde were reacted together in toluene with a molar ratio of 1:1.8:0.1:4.1, respectively. Toluene was distilled away, and a composition H (hereinafter, referred to as "O-PO type") was obtained. The purity was measured to be 50% by GPC.

[Chem. 16]

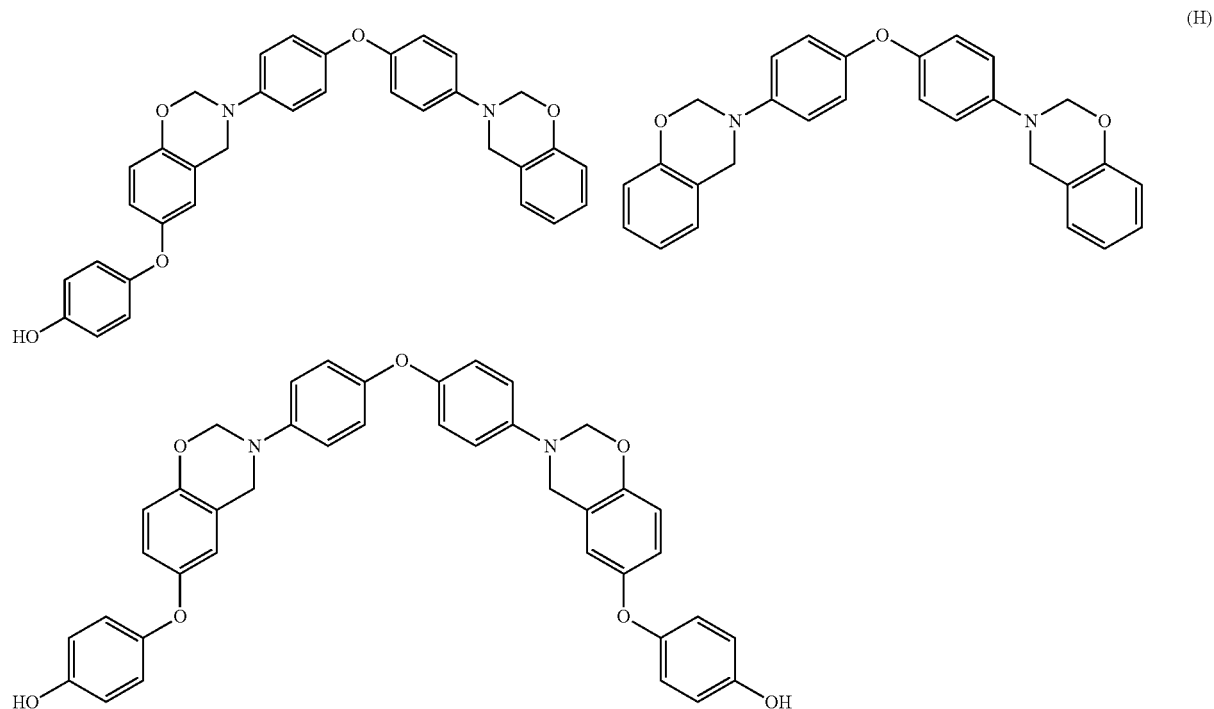

(H)

<Synthetic Example I> Synthesis of Bisphenol F-Modified Benzoxazine-System Composition 4,4'-ODA, phenol, Bisphenol F and 92% paraformaldehyde were reacted together in toluene with a molar ratio of 1:1.8:0.1:4.1, respectively. Toluene was distilled away, and a composition I (hereinafter, referred to as "O-PBF type") was obtained. The purity was measured to be 45% by GPC.

[Chem. 17]

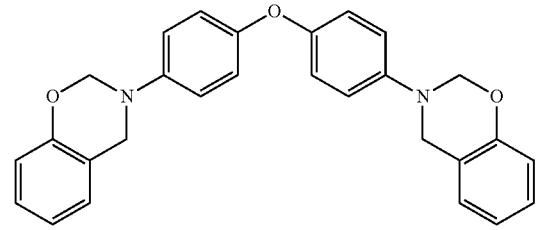
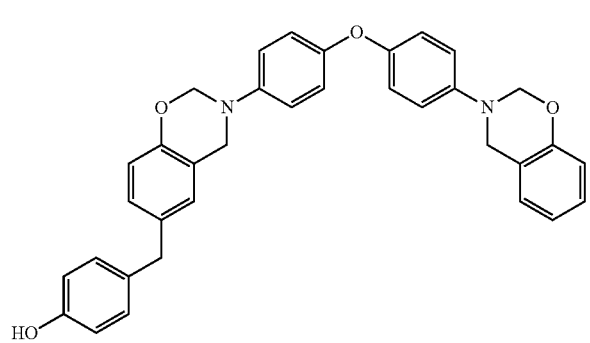
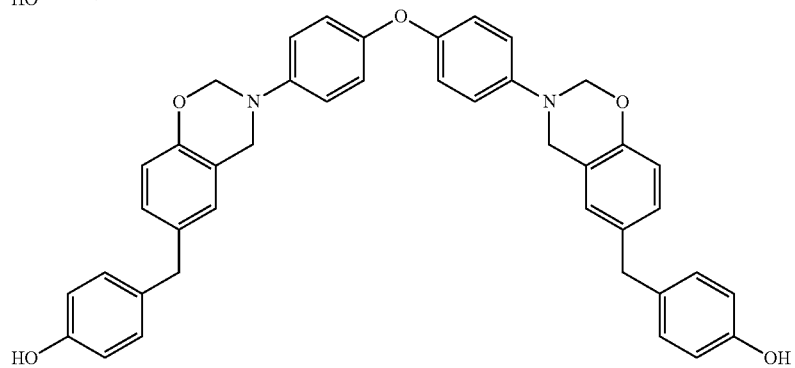

(I)

Examples and Comparative Examples

<Example 1>

The O-P type and the D-P type were mixed with each other with a mass ratio of 50:50. The mixture was fused and mixed by being heated to near the softening temperature. Thus, a thermosetting composition was prepared.

To evaluate the solvent solubility of this thermosetting composition, the thermosetting composition prepared above was gradually dissolved in acetone. The solvent solubility was determined on the basis of solubility [%] at the point where the dissolution ceased.

Next, the thermosetting composition was dissolved in acetone to give a varnish having a concentration of 60% by mass in terms of solid content.

To evaluate the cold storage stability of the varnish, the varnish prepared above was stored in a refrigerator at not more than 5° C. for 2 weeks. The presence or absence of precipitates was evaluated [Present/Absent].

Further, the thermosetting composition was thermally cured by heating at 250° C. for 3 hours, and the thermosetting material was tested by the aforementioned methods to measure or evaluate the glass transition temperature (Tg) [° C.], the water absorption [%], the flame retardance (UL 94) and the 5% weight loss temperature (Td5%) [° C.].

The results are described in Table 1.

<Example 2>

A thermosetting composition, a varnish and a thermosetting material were prepared by the same steps as in EXAMPLE 1, except that the mixing ratio of the O-P type and the D-P type was changed to 60:40 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 3>

A thermosetting composition, a varnish and a thermosetting material were prepared by the same steps as in EXAMPLE 1, except that the mixing ratio of the O-P type and the D-P type was changed to 40:60 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 4>

A thermosetting composition, a varnish and a thermosetting material were prepared by the same steps as in EXAMPLE 1, except that the O-P type and the D-PB type were mixed together with a mixing ratio of 50:50 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 5>

A thermosetting composition, a varnish and a thermosetting material were prepared by the same steps as in EXAMPLE 1, except that the O-P type, the D-P type and the B-A type were mixed together with a mixing ratio of 45:45:10 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 6>

A thermosetting composition, a varnish and a thermosetting material were prepared by the same steps as in EXAMPLE 1, except that the O-P type and the D-P type were mixed together with a mixing ratio of 50:50 on the mass basis and 0.1%/solid content of 1-methylimidazole was added to the mixture. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 7>

A thermosetting composition, a varnish and a thermosetting material were prepared by the same steps as in EXAMPLE 1, except that the D-P type and the O-PB type were mixed together with a mixing ratio of 50:50 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material.

The results are described in Table 1.

<Example 8>

The composition E was subjected to the same steps as described in EXAMPLE 1, thereby preparing a thermosetting composition, a varnish and a thermosetting material. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 9>

A thermosetting composition, a varnish and a thermosetting material were prepared by the same steps as in EXAMPLE 1, except that the O-P type, the D-PB type and the B-A type were mixed together with a mixing ratio of 40:50:10 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 10>

A thermosetting composition, a varnish and a thermosetting material were prepared by the same steps as in EXAMPLE 1, except that the O-P type and the D-P type were mixed together with a mixing ratio of 50:50 on the mass basis. (In this EXAMPLE, this thermosetting composition will be referred to as "additive-free composition".)

The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

Separately, a thermosetting composition was prepared by adding 0.5%/solid content of 2-methylimidazole to the above composition. (In this EXAMPLE, this thermosetting composition will be referred to as "additive-containing composition".)

The additive-free composition and the additive-containing composition prepared above were analyzed with a rheometer (viscoelastometer PHYSICA MCR300 manufactured by DKSH Japan K.K.) to measure the dynamic viscoelasticity (G') at 180° C. and 200° C. The curing of the additive-free composition completed in 45 minutes. In contrast, the curing of the additive-containing composition completed in 15 minutes. FIG. 1 shows curing behaviors with and without the addition of 2-methylimidazole.

<Example 11>

A thermosetting composition, a varnish and a thermosetting material were prepared by the same steps as in EXAMPLE 1, except that the D-P type and the O-C type were mixed together with a mixing ratio of 60:40 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 12>

A thermosetting composition, a varnish and a thermosetting material were prepared by the same steps as in EXAMPLE 1, except that the D-P type and the O-TB type were mixed together with a mixing ratio of 60:40 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 13>

A thermosetting composition, a varnish and a thermosetting material were prepared by the same steps as in EXAMPLE 1, except that the D-P type and the O-PBH type were mixed together with a mixing ratio of 40:60 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 14>

A thermosetting composition, a varnish and a thermosetting material were prepared by the same steps as in EXAMPLE 1, except that the D-P type and the O-PO type were mixed together with a mixing ratio of 40:60 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Example 15>

A thermosetting composition, a varnish and a thermosetting material were prepared by the same steps as in EXAMPLE 1, except that the D-P type and the O-PBF type were mixed together with a mixing ratio of 40:60 on the mass basis. The tests were carried out in the same manner to measure or evaluate the solvent solubility of the thermosetting composition, the cold storage stability of the varnish, and the glass transition temperature, the water absorption, the flame retardance and the 5% weight loss temperature of the thermosetting material. The results are described in Table 1.

<Comparative Example 1>
A composition was prepared and properties were evaluated by the same steps as in EXAMPLE 1, except that the O-P type alone was used. The results are described in Table 2.

<Comparative Example 2>
A composition was prepared and properties were evaluated by the same steps as in EXAMPLE 1, except that the D-P type alone was used. The results are described in Table 2.

<Comparative Example 3>
A composition was prepared and properties were evaluated by the same steps as in EXAMPLE 1, except that the D-PB type alone was used. The results are described in Table 2.

<Comparative Example 4>
A composition was prepared and properties were evaluated by the same steps as in EXAMPLE 1, except that the O-PB type alone was used. The results are described in Table 2.

<Comparative Example 5>
A composition was prepared and properties were evaluated by the same steps as in EXAMPLE 1, except that the mixing ratio of the O-P type and the D-P type was changed to 80:20 on the mass basis. The results are described in Table 2.

<Comparative Example 6>
A composition was prepared and properties were evaluated by the same steps as in EXAMPLE 1, except that the mixing ratio of the O-P type and the D-P type was changed to 20:80 on the mass basis. The results are described in Table 2.

<Comparative Example 7>
A composition was prepared and properties were evaluated by the same steps as in EXAMPLE 1, except that the O-C type alone was used. The results are described in Table 2.

<Comparative Example 8>
A composition was prepared and properties were evaluated by the same steps as in EXAMPLE 1, except that the O-TB type alone was used. The results are described in Table 2.

<Comparative Example 9>
A composition was prepared and properties were evaluated by the same steps as in EXAMPLE 1, except that the O-PBH type alone was used. The results are described in Table 2.

<Comparative Example 10>
A composition was prepared and properties were evaluated by the same steps as in EXAMPLE 1, except that the O-PO type alone was used. The results are described in Table 2.

<Comparative Example 11>
A composition was prepared and properties were evaluated by the same steps as in EXAMPLE 1, except that the O-PBF type alone was used. The results are described in Table 2.

<Comparative Example 12>
A composition was prepared and properties were evaluated by the same steps as in EXAMPLE 1, except that the O-P type, the D-PB type and the B-A type were mixed together with a mixing ratio of 20:20:60 on the mass basis. The results are described in Table 2.

<Comparative Example 13>
A composition was prepared and properties were evaluated by the same steps as in EXAMPLE 1, except that the B-A type alone was used. The results are described in Table 2.

TABLE 1

| | | Thermosetting compositions Solvent solubility [%] | Varnishes Cold storage stability [Present/Absent] | Thermosetting materials | | | |
|---|---|---|---|---|---|---|---|
| | | | | Glass transition temperature [° C.] | Water absorption [%] | Flame retardance (UL94) | 5% Weight loss temperature [° C.] |
| EXAMPLES | 1 | 65 | Absent | 177 | 0.43 | V-0 | 416 |
| | 2 | 65 | Absent | 176 | 0.45 | V-0 | 415 |
| | 3 | 65 | Absent | 179 | 0.52 | V-0 | 415 |
| | 4 | 65 | Absent | 193 | 0.50 | V-0 | 418 |
| | 5 | 65 | Absent | 176 | 0.51 | V-1 | 385 |
| | 6 | 65 | Absent | 176 | 0.49 | V-0 | 415 |
| | 7 | 65 | Absent | 185 | 0.52 | V-0 | 412 |
| | 8 | 60 | Absent | 180 | 0.53 | V-0 | 415 |
| | 9 | 65 | Absent | 175 | 0.53 | V-1 | 385 |
| | 10 | 65 | Absent | 177 | 0.57 | V-0 | 410 |
| | 11 | 65 | Absent | 175 | 0.52 | V-1 | 379 |
| | 12 | 65 | Absent | 177 | 0.47 | V-0 | 393 |
| | 13 | 65 | Absent | 190 | 0.52 | V-1 | 382 |
| | 14 | 65 | Absent | 188 | 0.51 | V-1 | 381 |
| | 15 | 65 | Absent | 189 | 0.52 | V-0 | 412 |

TABLE 2

| | | Thermosetting compositions Solvent solubility [%] | Varnishes Cold storage stability [Present/Absent] | Thermosetting materials | | | |
|---|---|---|---|---|---|---|---|
| | | | | Glass transition temperature [° C.] | Water absorption [%] | Flame retardance (UL94) | 5% Weight loss temperature [° C.] |
| EXAMPLES | 1 | 60 | Present | 173 | 0.45 | V-0 | 419 |
| COMPARATIVE | 2 | 50 | Present | 191 | 0.48 | V-0 | 413 |
| | 3 | 55 | Present | 198 | 0.52 | V-0 | 416 |
| | 4 | 55 | Present | 179 | 0.56 | V-0 | 415 |
| | 5 | 60 | Present | 174 | 0.55 | V-0 | 416 |
| | 6 | 55 | Present | 187 | 0.54 | V-0 | 416 |

TABLE 2-continued

| Thermosetting compositions Solvent solubility [%] | Varnishes Cold storage stability [Present/Absent] | Thermosetting materials | | | |
|---|---|---|---|---|---|
| | | Glass transition temperature [° C.] | Water absorption [%] | Flame retardance (UL94) | 5% Weight loss temperature [° C.] |
| 7  | 55 | Present | 168 | 0.54 | V-1 | 401 |
| 8  | 55 | Present | 165 | 0.55 | V-1 | 403 |
| 9  | 55 | Present | 179 | 0.53 | V-1 | 412 |
| 10 | 60 | Present | 177 | 0.55 | V-1 | 411 |
| 11 | 55 | Present | 178 | 0.52 | V-1 | 412 |
| 12 | 60 | Present | 173 | 0.58 | V-1 | 365 |
| 13 | 65 | Absent  | 171 | 0.64 | V-1 | 348 |

DISCUSSION OF RESULTS

<Examples 1 to 15>

The required performances were satisfied in all of the solvent solubility of the thermosetting compositions with respect to a low-boiling solvent (acetone), the cold storage stability of the varnishes, and the glass transition temperature, the water absorption (an indicator of a decrease in strength due to the absorption of water), the flame retardance and the 5% weight loss temperature (an indicator of heat resistance) of the thermosetting materials.

<<Example 10>>

The graph in FIG. 1 shows relationships between the dynamic viscoelasticity (G') and the heating time in EXAMPLE 10.

In order to substitute for an epoxy resin, it is preferable that the composition be cured within 30 minutes at 180° C. The composition to which 0.5%/solid content of a curing accelerator (2-methylimidazole) had been added was cured within 30 minutes at both of 180° C. and 200° C., achieving a more than 50 percent reduction in curing time compared to the composition without the addition.

<Comparative Examples 1 to 13>

The thermosetting compositions in COMPARATIVE EXAMPLES 2 to 4, 6 to 9 and 11 failed to satisfy the required performance in terms of solvent solubility with respect to a low-boiling solvent (acetone).

The varnishes in COMPARATIVE EXAMPLES 1 to 12 failed to satisfy the required performance in terms of cold storage stability.

The thermosetting material in COMPARATIVE EXAMPLE 13 failed to satisfy the required performances in terms of glass transition temperature, water absorption and 5% weight loss temperature.

INDUSTRIAL APPLICABILITY

The benzoxazine-system compositions according to the present invention exhibit excellent solvent solubility, heat resistance and flame retardance. Thus, the thermosetting materials and the varnishes of the compositions can be used in laminated sheets, adhesives and electronic materials such as sealants, and greatly contribute to the development of industry.

The invention claimed is:

1. A thermosetting composition comprising 30% to 70% by mass of a compound represented by Formula (1) and 70% to 30% by mass of a compound represented by Formula (2):

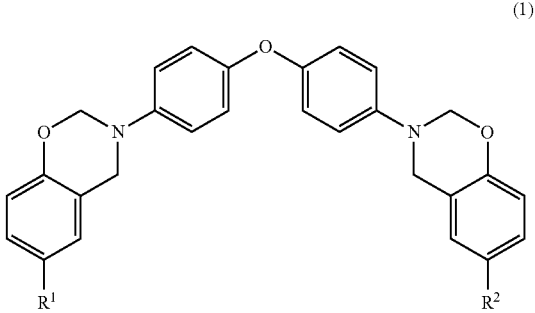

(1)

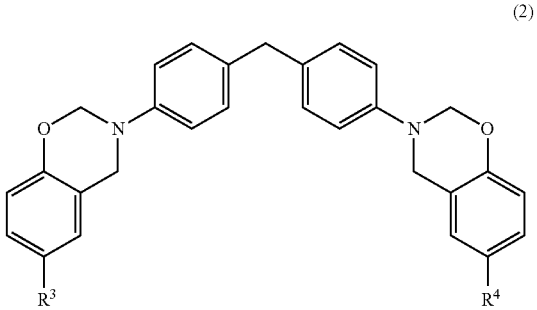

(2)

wherein in Formulae (1) and (2), $R^1$, $R^2$, $R^3$ and $R^4$ may be the same or different from one another and are each selected independently with respect to each molecule of the compounds from the group consisting of —H, —$CH_3$, —$C(CH_3)_3$ and a group represented by Formula (i) below:

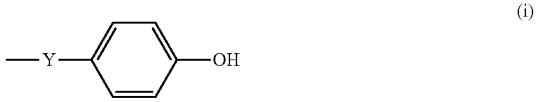

(i)

wherein in Formula (i), Y is selected from the group consisting of —O—, —$CH_2$— and —$C(CH_3)_2$—.

2. The thermosetting composition according to claim 1, wherein the total number of moles of the group represented by Formula (i) in the compound of Formula (1) and the group represented by Formula (i) in the compound of Formula (2) represents 1 to 50 mol % relative to the total number of moles of $R^4$ and $R^2$ in the compound represented by Formula (1) and $R^3$ and $R^4$ in the compound represented by Formula (2).

3. The thermosetting composition according to claim 2, further comprising a compound represented by Formula (3) in an amount of 0.1 to 30 parts by mass with respect to 100 parts by mass of the total of the compound represented by Formula (1) and the compound represented by Formula (2):

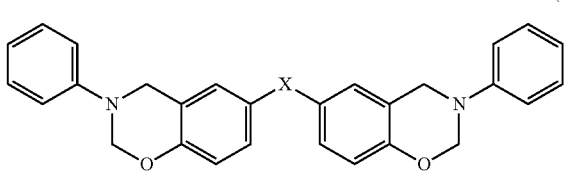

(3)

wherein in Formula (3), X is selected from the group consisting of —O—, —CH$_2$— and —C(CH$_3$)$_2$—.

4. The thermosetting composition according to claim 3, which exhibits a solubility of not less than 60% with respect to acetone or methyl ethyl ketone and, after being dissolved, does not form a precipitate even when being stored at 5° C. or below for 2 or more weeks.

5. The thermosetting composition according to claim 1, further comprising a compound represented by Formula (3) in an amount of 0.1 to 30 parts by mass with respect to 100 parts by mass of the total of the compound represented by Formula (1) and the compound represented by Formula (2):

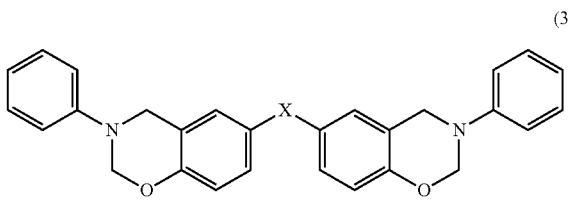

(3)

wherein in Formula (3), X is selected from the group consisting of —O—, —CH$_2$— and —C(CH$_3$)$_2$—.

6. The thermosetting composition according to claim 2, which exhibits a solubility of not less than 60% with respect to acetone or methyl ethyl ketone and, after being dissolved, does not form a precipitate even when being stored at 5° C. or below for 2 or more weeks.

7. The thermosetting composition according to claim 5, which exhibits a solubility of not less than 60% with respect to acetone or methyl ethyl ketone and, after being dissolved, does not form a precipitate even when being stored at 5° C. or below for 2 or more weeks.

8. The thermosetting composition according to claim 1, which exhibits a solubility of not less than 60% with respect to acetone or methyl ethyl ketone and, after being dissolved, does not form a precipitate even when being stored at 5° C. or below for 2 or more weeks.

9. A varnish comprising the composition of claim 1, and an organic solvent in which the compound of Formula (1) and the compound of Formula (2) are dissolved.

10. A varnish comprising the composition of claim 2, and an organic solvent in which the compound of Formula (1) and the compound of Formula (2) are dissolved.

11. A varnish comprising the composition of claim 5, and an organic solvent in which the compound of Formula (1), the compound of Formula (2) and the compound of Formula (3) are dissolved.

12. A thermosetting material obtained by thermally curing the thermosetting composition of claim 1.

13. The thermosetting material according to claim 12, which has a glass transition temperature (Tg) of 175° C. to 250° C., a 5% weight loss temperature (Td5%) of 350° C. to 450° C., a water absorption of not more than 1.0%, and a flame retardance of UL 94 V-0 to V-1.

14. A thermosetting material obtained by thermally curing the thermosetting composition of claim 2.

15. A thermosetting material obtained by thermally curing the thermosetting composition of claim 5.

16. A thermosetting material obtained by thermally curing the thermosetting composition of claim 3.

\* \* \* \* \*